US009282458B2

(12) United States Patent
Anson

(10) Patent No.: US 9,282,458 B2
(45) Date of Patent: Mar. 8, 2016

(54) METHOD AND SYSTEM FOR REPORTING, SECURING AND CONTROLLING MOBILE PHONES WHICH ARE LOST (MISPLACED\STOLEN)

(71) Applicant: Mark Rodney Anson, Ewingsdale (AU)

(72) Inventor: Mark Rodney Anson, Ewingsdale (AU)

( * ) Notice: Subject to any disclaimer, the term of this patent is extended or adjusted under 35 U.S.C. 154(b) by 0 days.

(21) Appl. No.: 14/295,729

(22) Filed: Jun. 4, 2014

(65) Prior Publication Data
US 2014/0357230 A1 Dec. 4, 2014

Related U.S. Application Data

(60) Provisional application No. 61/835,560, filed on Jun. 15, 2013.

(30) Foreign Application Priority Data

Jun. 4, 2013 (AU) ................................ 2013902015
Jun. 5, 2013 (AU) ................................ 2013902033

(51) Int. Cl.
*H04W 12/06* (2009.01)
*H04W 12/08* (2009.01)

(52) U.S. Cl.
CPC ..................... *H04W 12/06* (2013.01)

(58) Field of Classification Search
CPC ............................. H04W 12/06; H04W 12/08

USPC ................................... 455/411; 715/825, 835
See application file for complete search history.

(56) References Cited

U.S. PATENT DOCUMENTS

| 8,407,112 | B2 | 3/2013 | Walter | |
|---|---|---|---|---|
| 2006/0099929 | A1* | 5/2006 | Frank | H04L 63/0428 455/411 |
| 2009/0313165 | A1 | 12/2009 | Walter | |
| 2010/0130167 | A1* | 5/2010 | Bennett | H04L 63/30 455/411 |
| 2010/0273452 | A1* | 10/2010 | Rajann | H04W 8/22 455/411 |
| 2012/0196571 | A1* | 8/2012 | Grkov et al. | 455/411 |
| 2013/0252585 | A1* | 9/2013 | Moshir | G06F 21/35 455/411 |
| 2013/0260722 | A1* | 10/2013 | Pi | H04W 12/12 455/411 |
| 2013/0273892 | A1* | 10/2013 | Parker, II | H04W 8/22 455/411 |
| 2014/0195974 | A1* | 7/2014 | Ballard et al. | 715/825 |

* cited by examiner

*Primary Examiner* — Qun Shen
(74) *Attorney, Agent, or Firm* — Wagenknecht IP Law Group PC

(57) ABSTRACT

An electronic system comprising: means for authenticating a report that a first device has been lost, by using a password entered into a second device that is connected to the system, by displaying, in an irregular manner, a plurality of symbols used to enter the password, where the symbols appear on an electronic screen of the second device.

6 Claims, 2 Drawing Sheets

METHOD AND SYSTEM FOR REPORTING, SECURING AND CONTROLLING MOBILE PHONES WHICH ARE LOST (MISPLACED\STOLEN)

CROSS REFERENCE TO RELATED APPLICATIONS

This invention claims priority to Australian patent application no. 2013902033 entitled, "A Method for Reporting, Securing and Controlling Mobile Phones Which are Lost or Stolen", filed 5 Jun. 2013; Australian patent application no. 2013902015 entitled, "A Login Process for Mobile Phones, Tablets and Other Types of Touch Screen Devices", filed 4 Jun. 2013; and US provisional patent application No. 61/835,560 entitled, "Method for Reporting, Securing and Controlling Mobile Phones Which are Lost or Stolen", filed 15 Jun. 2013; each of which is hereby incorporated by reference as though fully set forth herein.

BACKGROUND OF THE INVENTION

1. Technical Field

The present invention pertains to the field of portable communication devices.

2. Background Art

Portable communication devices including mobile phones have a long history. However, despite improvements in technology to prevent theft and associated use by unauthorized persons of lost phones, security issues remain an ongoing concern.

SUMMARY OF INVENTION

General problems with the background art, as identified by the inventor, include: limited use of biometric authentication in mobile communication technology.

Specific problems with the background art, as identified by the inventor include: the failure of a theft reporting authentication system to make use of a camera on a mobile phone (the camera being in one preferred embodiment, front facing).

To ameliorate some of the effects of the general problems and the specific problems as recited above and in particular to provide, at least in part, a method that makes use of biometric authentication in order to report the theft of a mobile phone.

Technical Solution

Central to the inventor's discovery is the realization that biometric authentication, including the possibility of authentication by a physical person located at a credentialing centre (a Digital Identity Management Service (DIMS)), can impede the issue of false and also fraudulent theft reports (particularly reports that are exclusively reliant upon electronic password entry for authentication purposes). In particular, use of a camera installed in a mobile phone for purposes of biometric authentication of a report that a phone has been stolen (theft authentication) can be an effective means for deterring the making of false and fraudulent reports (particularly if the facial details of a person making a false report can be captured and passed on to law enforcement authorities).

Advantageous Effects

Advantageous effects include:
An unauthorized person is likely to be reluctant to falsely report the theft of a mobile phone if his\her face is going to be captured by a camera installed on a mobile phone.

In accordance with the above, the invention includes an electronic system, including means for authenticating a report that a first device has been lost, by using a password entered into a second device that is connected to the system, by displaying, in an irregular manner, a plurality of symbols used to enter the password, where the symbols appear on an electronic screen of the second device.

DETAILED DESCRIPTION

Best Mode

Definitions and Terms

Figure 1:
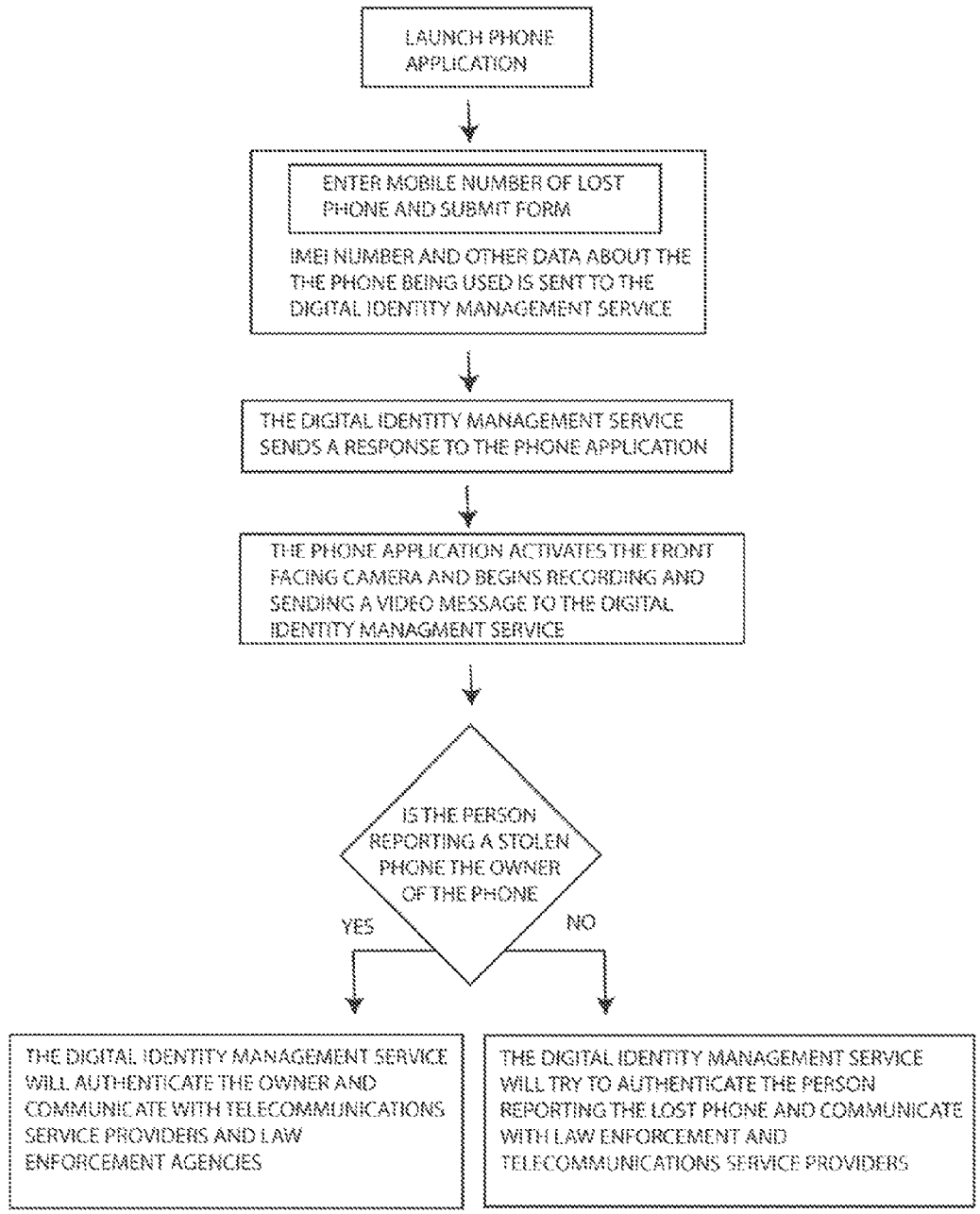
FIG. 1 illustrates a series of steps involved in reporting a lost or stolen phone according to one embodiment of the present invention.

The description in the body of the specification pertains to 'preferred' modes of invention. Accordingly, features recited in the body of the specification should not be construed to be essential features of the invention unless explicitly indicated. In particular, references to a phone can in other embodiments include references to any portable communication device.

Any reference in the body of the specification to the expression "invention" should be construed to imply a reference to preferred embodiments.

The expression "loss" can include misplacement or theft.

According to one preferred mode of invention, a method of reporting a lost phone includes steps (not necessarily in the following order) of:

A first person after discovering that his\her phone has been lost, can seek a second person with a smartphone to allow the first person to use the second person's phone to report the fact that the first person's phone has been lost.

To report the lost phone, the first person can take the second person's phone and launch a software application for reporting lost phones that can be installed on the second person's phone.

When the application launches, the application displays this message or words to this effect:

"Enter the phone number of the lost phone in the form below and submit this form by clicking the button "Report A Lost Phone"".

The application can then transmit the lost phone's number and other data to a Digital Identity Management Service (DIMS) that can maintain a register of mobile phones and their owners.

Identifying indicia for a phone including the IMEI (International Mobile Equipment Identity) of the phone being used by the first person (who is reporting the lost phone) can then be sent to the Digital Identity Management Service. The Digital Identity Management Service can receive this information and send back a response to the second person's phone to report the fact that the first person's phone has been lost.

In the response process initiated by the Digital Identity Management Service (DIMS), the application that connects to the DIMS will be directed to activate a front facing camera (in one preferred embodiment) of the smartphone and begin recording the face of the person who is reporting the lost phone (the first person using the second person's phone) and this person (the first person) looking at the smartphone screen can read questions on the screen and respond with answers (with this data being streamed to the DIMS which can then use biometric analysis to examine the things being said by the person being filmed (the first person being filmed using the second person's phone)).

The Digital Identity Management Service (DIMS) can use speech recognition software to translate the answers given by the person (the first person) reporting a lost phone into text that is further analysed by software capable of determining appropriate replies in the answers being given by the reporting person, and moreover depending on the answers that are given by the reporting person the Digital Identity Management Service can be configured to determine if the person reporting the lost phone is providing factually correct information. Further, the software used to authenticate the report can also include voice recognition software to confirm that the person speaking is in fact the first person in the present case.

A person reporting a lost phone can be asked whether they are the owner of the phone being used to report the lost phone. In this case if the first person falsely indicates that he\she is the owner of the second person's phone then an alarm could be triggered.

The owner of a lost phone could have had a mobile phone that uses a secure access code controlled by the DIMS to unlock the lost phone, and if so the Digital Identity Management Service could choose to present a login screen on the current smartphone (the second person's phone) that is accessed by the code, so that the owner of the lost phone can enter their login data including the secure access code and so demonstrate to the DIMS that they truly are the owner of the missing phone. Further, to the above, in the case of theft, once this process has been completed then the lost phone (the first person's phone) can be immediately deactivated or allowed to continue to operate, temporarily, to enable law enforcement officers to catch a thief by using tracking technology and potentially leading the law enforcement officers to the location of other stolen property.

FIG. 1 illustrates a series of tasks involved in reporting a lost phone according to one embodiment of the present invention.

Figure 2:
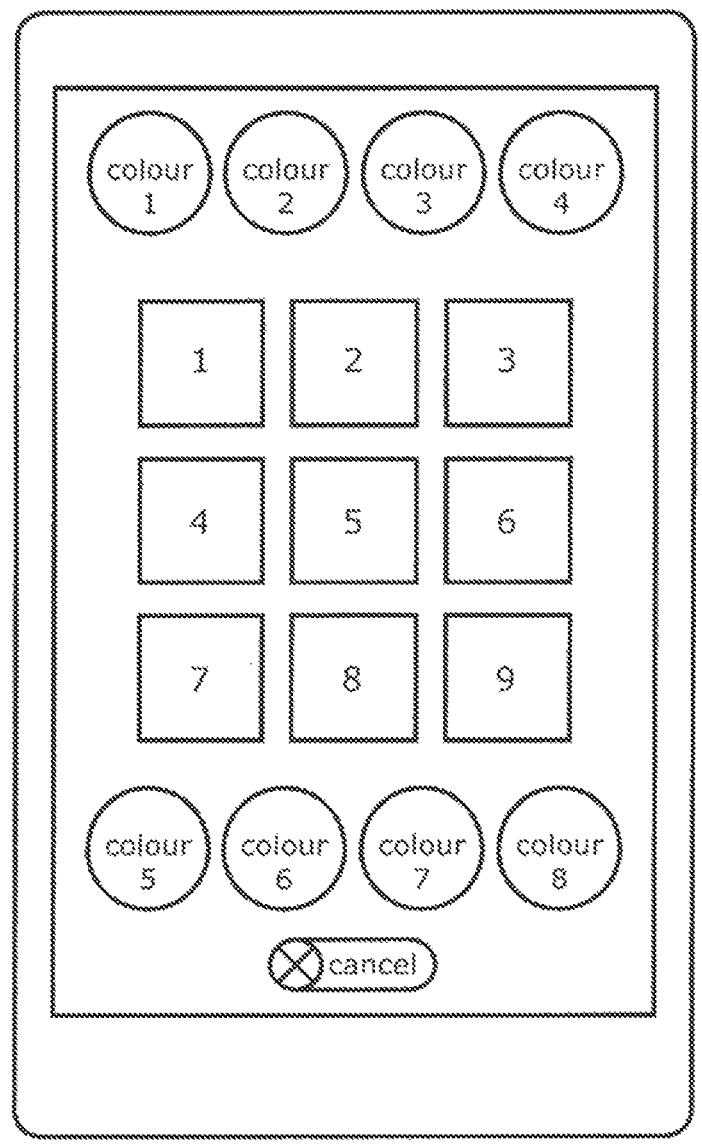
FIG. 2 illustrates a login system for use during the login process and authentication when reporting the fact that a phone has been stolen.

FIG. 2 shows the image of a login swipe system that can be used for authentication. The swipe system will now be described.

Using a secure access code, the owner of the lost mobile phone (the first person) can put his/her finger on colour 4 (which can be red) and swipe his/her finger across the screen until his\her finger is above the number 3 on the keypad, then the person can put his/her finger on colour 7 (which can be green) and swipe his/her finger across the screen until it is above the number 9 on the keypad, with the result that the input sequence "Red", "3", "Green", "9" is recorded and transmitted to the Digital Identity Management Service as the secure access code for this user.

When the Digital Identity Management Service (DIMS) receives the secure access code and is able to confirm that this is the proper access code for the user of the lost phone, the Digital Identity Management Service can pass on a confirmation to the telecommunications service provider that the phone's true owner (the first person) has reported his\her phone (the first phone) as lost by using the second person's phone.

Using biometric analysis of voice and facial features of the person who is being filmed, the Digital Identity Management Service (DIMS) can also assist in confirming (authenticating the fact) that the first phone's true owner has indeed reported the first phone as lost provided that the owner of the lost phone (the first phone) has actually registered his\her biometric profile data including his\her voice and facial image with the Digital Identity Management Service (DIMS).

The telecommunications service provider can then initiate further actions including: informing law enforcement agencies about the loss of the phone; forwarding a copy to the police of the video message of the person reporting the lost phone; tracking the lost phone (the first phone); locking the phone or finding the location of the phone and providing information to the owner about the location of a lost phone (however, in the case of a known theft, persons whose phones have been stolen can also be instructed to leave the recovery of the phone to law enforcement officials).

The telecommunications service provider and the Digital Identity Management Service (DIMS) can keep records of the IMEI number of phones and these services can communicate with other telecommunications service providers informing them that the mobile phone with a given IMEI number has been lost (which will thus prevent transfer of the phone to another network).

If the person reporting a lost phone is not the owner (not the first person in this case), the reporting person can be asked to supply his\her contact details and other information, and a message can be sent to law enforcement authorities supplying details of the person reporting the lost phone, as well as details of the owner of the phone being used to make the report (in this case the second person's phone).

When the person reporting that a phone has been lost is not the owner (for example if the second person reports a theft), the reporting person can also enter a secure access code to prove their identity if they also have their login details registered with the Digital Identity Management Service (DIMS). The biometric details of the reporting person can also be analysed to provide an additional layer of security for purposes of authenticating the report.

As previously recited, the above authentication process means that in a case where a malicious person has falsely claimed that another person's phone has been lost then this mischievous claim could be detected and dealt with by law enforcement authorities.

When communications with a Digital Identity Management Service (DIMS) and a telecommunications services provider are completed, the video capture process can be terminated, and the phone application for reporting a lost phone can then be closed.

In addition to biometric authentication, features of this system, according to one embodiment, can include the creation of a video message report of a lost phone that can be forwarded to law enforcement authorities; the aggregation of specific details of information for use in a reporting system to facilitate rapid deactivation of a lost phone so as to make the lost phone valueless and not worth stealing; the use of secure access codes for smartphones and a video to text translation method backed by software that can efficiently process a person's report of a lost phone.

MODE FOR INVENTION

Modes of the present invention can in generic form be used in association with any form of portable communications device including a laptop computer, smartphone and an iPhone and can also be used to report loss (misplaced\theft) of non-portable devices. For example, a desktop computer (that is seldom transported) can be reported as stolen using the above process.

INDUSTRIAL APPLICABILITY

In use, modes of the present invention can be used to inhibit phone theft by making it extremely difficult for an unauthorized person to falsely report the theft of a phone (a false report is likely to be filmed and could provide incriminating evidence against the person making the false report).

The present invention has been described in the context of software that is downloaded and stored on a computer readable medium. However, the present invention can also be envisaged as a process embodied in a propagated signal that is transmitted from the DIMS to a second phone used to report theft of the first phone. More generally, the process recited above can be envisaged to describe the electronic steps undertaken by a DIMS to authenticate a report that a phone has been lost (stolen/misplaced) including: (i) transmitting a "reporting application" (in the form of a propagated signal) from a DIMS to a second communication device (fixed\portable) being used to report loss of a first communication device (fixed\portable) (ii) receiving a report at the DIMS that the first phone has been lost; the report being issued from the second communication device using the reporting application that has been installed on the second communication device and (iii) biometrically authenticating the report.

As a further check upon security, the mobile communication device's location (that can be found by a plurality of methods including triangulation and GPS tracking) can be used to provide an added level of security in the context of embodiments of the present invention.

In use, the methods and systems recited above can be further secured by using means including:
i) irregular password entry;
ii) swipe gestures for password entry;
iii) randomizing displays for password entry;
iv) setting a minimal password entry length;
v) using at least one of the last known location of a lost device or the location of a device used to report the lost device, in order to authenticate a report pertaining to the lost device;
vi) using at least one of the identifying indicia of the lost device or the identifying indicia of a device used to report the loss, in order to authenticate the report;
vii) using biometric authentication including voice and facial recognition, in order to authenticate the report.

Copyright in drawings the subject of this application is reserved and remains the property of NOWWW.US Pty Ltd ACN 137 333 709 and its assigns.

What is claimed is:

1. An electronic system comprising:
means for authenticating a report that a first device has been lost, by using a password entered into a second device that is connected to the system, by displaying, in an irregular manner, a plurality of symbols used to enter the password, where the symbols appear on an electronic screen of the second device;
means for moving a first one of the symbols towards a second one of the symbols in order to enter the password;
means for entering the password using a swipe gesture;
means for randomizing the symbols in order to authenticate the report; and
means for using at least one of the first device's last known location and the second device's location, in order to authenticate the report.

2. The system as recited in claim 1, further comprising means for ensuring that the password is of at least a predetermined length.

3. The system as recited in claim 2, further comprising means for using at least one of the first device's identifying indicia and the second device's identifying indicia, in order to authenticate the report.

4. The system as recited in claim 3, further comprising means for using biometric authentication, in order to authenticate the report.

5. The system as recited in claim 4, further comprising means for using facial recognition, in order to authenticate the report.

6. The system as recited in claim 5, further comprising means for using voice recognition, in order to authenticate the report.

* * * * *